(12) United States Patent
Edwards et al.

(10) Patent No.: US 10,348,140 B2
(45) Date of Patent: Jul. 9, 2019

(54) APPARATUS AND METHODS FOR CONTROLLING TRANSMISSION OF DATA

(71) Applicant: ROLLS-ROYCE plc, London (GB)

(72) Inventors: Huw L Edwards, Derby (GB); Vishal K. Dhutia, Derby (GB); Faidon Mitzalis, Derby (GB); Edoardo G Frau, Derby (GB); Mathias H Broman, Derby (GB); Werner P Schiffers, Derby (GB)

(73) Assignee: ROLLS-ROYCE plc, London (GB)

( * ) Notice: Subject to any disclaimer, the term of this patent is extended or adjusted under 35 U.S.C. 154(b) by 374 days.

(21) Appl. No.: 15/202,112

(22) Filed: Jul. 5, 2016

(65) Prior Publication Data

US 2017/0033617 A1 Feb. 2, 2017

(30) Foreign Application Priority Data

Jul. 29, 2015 (GR) ............................... 20150100334
Sep. 1, 2015 (GB) .................................. 1515492.5

(51) Int. Cl.
  *H01F 27/42* (2006.01)
  *H01F 37/00* (2006.01)
  (Continued)

(52) U.S. Cl.
  CPC .............. *H02J 50/80* (2016.02); *B63H 5/125* (2013.01); *H02J 7/34* (2013.01); *H02J 50/12* (2016.02);
  (Continued)

(58) Field of Classification Search
  CPC . B63H 5/125; B63H 2005/1256; H02J 50/80; H02J 7/025; H04B 5/0031
  See application file for complete search history.

(56) References Cited

U.S. PATENT DOCUMENTS 3,876,998 A  4/1975 Richter et al.
5,700,212 A  12/1997 Meckstroth
(Continued)

FOREIGN PATENT DOCUMENTS

DE  102007060571 A1  6/2009
EP      2960147 A1  12/2015
(Continued)

OTHER PUBLICATIONS

Feb. 11, 2016 Search Report issued in Great Britain Patent Application No. GB1515492.5.
(Continued)

*Primary Examiner* — Rexford N Barnie
*Assistant Examiner* — Rasem Mourad
(74) *Attorney, Agent, or Firm* — Oliff PLC

(57) ABSTRACT

Apparatus to control transmission of data, the apparatus comprising: a controller configured to: receive data from at least a first sensor within an azimuth thruster; control storage of the received data in memory; determine whether at least one criterion is satisfied, the at least one criterion varying with the relative positioning of a first antenna mounted on a lower housing of the azimuth thruster and a second antenna mounted on an upper housing of the azimuth thruster, the lower housing being configured to rotate relative to the upper housing; and control transmission of the stored data from the first antenna in response to determining that the at least one criterion is satisfied.

18 Claims, 11 Drawing Sheets

(51) Int. Cl.
  *H01F 38/00* (2006.01)
  *H02J 50/80* (2016.01)
  *B63H 5/125* (2006.01)
  *H04B 5/00* (2006.01)
  *H02J 50/12* (2016.01)
  *H02J 7/34* (2006.01)
  *H02J 7/02* (2016.01)

(52) U.S. Cl.
  CPC ... *H04B 5/0031* (2013.01); *B63H 2005/1256* (2013.01); *H02J 7/025* (2013.01); *H02J 7/345* (2013.01); *H04B 5/0037* (2013.01); *H04B 5/0075* (2013.01)

(56) References Cited

U.S. PATENT DOCUMENTS

| | | | | |
|---|---|---|---|---|
| 2005/0258953 | A1* | 11/2005 | Saitou | B60C 23/0408 340/447 |
| 2010/0127892 | A1* | 5/2010 | Wesselink | H04Q 9/00 340/870.07 |
| 2012/0122400 | A1 | 5/2012 | Kitagawa et al. | |
| 2013/0133404 | A1* | 5/2013 | Patel | F24F 11/30 73/29.02 |
| 2016/0094043 | A1* | 3/2016 | Hao | H01F 38/14 307/104 |

FOREIGN PATENT DOCUMENTS

| | | | | |
|---|---|---|---|---|
| EP | 2961087 | A1 | 12/2015 | |
| KR | 20150066234 | A * | 6/2015 | ............ B63H 5/125 |
| KR | 20150066234 | A | 6/2015 | |
| WO | 00/15495 | A1 | 3/2000 | |
| WO | 2008060150 | A1 | 5/2008 | |

OTHER PUBLICATIONS

Chaimanonart, Nattapon et al. "Remote RF Powering System for MEMS Strain Sensors." Conference paper (Nov. 2004).

Dec. 8, 2016 European Search Report issued in Patent Application No. EP 16 17 7914.

* cited by examiner

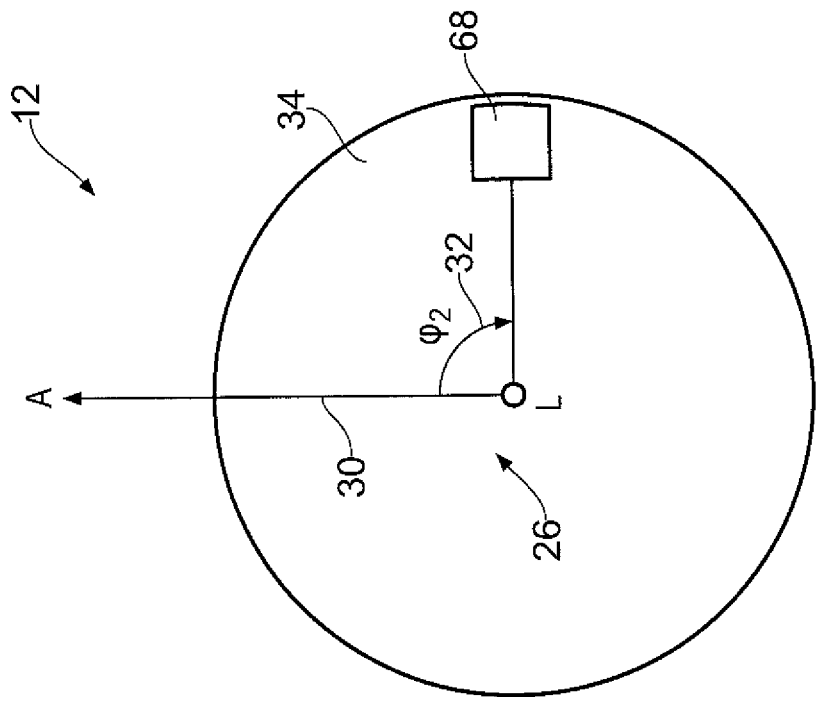
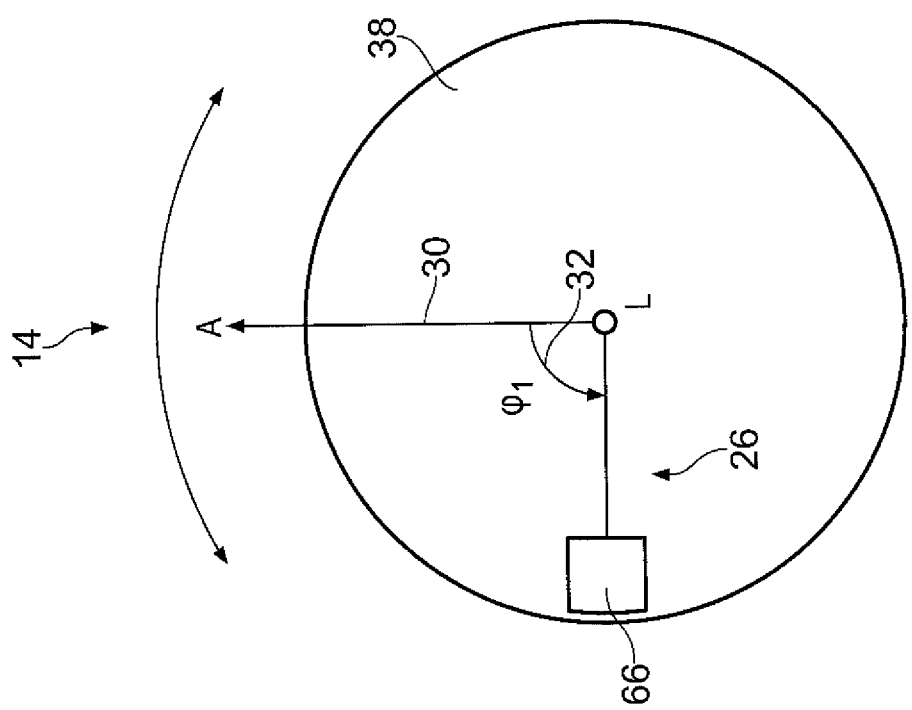

APPARATUS AND METHODS FOR CONTROLLING TRANSMISSION OF DATA

TECHNOLOGICAL FIELD

The present disclosure concerns apparatus and methods for controlling transmission of data.

BACKGROUND

Mechanical systems may comprise at least one part that is rotatable relative to an adjacent (stationary or rotatable) part of the mechanical system. The transfer of electrical signals between two such parts may present several challenges due to the movement of the two parts.

For example, a vessel may comprise an azimuth thruster for propelling the vessel in water. The azimuth thruster usually includes a propeller that may be rotated about a vertical axis to select the direction of thrust. Transferring an electrical signal between a stationary part of the azimuth thruster and a rotatable part of the azimuth thruster may present several challenges. By way of an example, it may be challenging to transfer an electrical signal via a wired connection between the stationary and rotatable parts because relative movement between the stationary and rotatable parts may cause wear on the wired connection.

BRIEF SUMMARY

According to various, but not necessarily all, embodiments of the invention there is provided apparatus to control transmission of data, the apparatus comprising: a controller configured to: receive data from at least a first sensor within an azimuth thruster; control storage of the received data in memory; determine whether at least one criterion is satisfied, the at least one criterion varying with the relative positioning of a first antenna mounted on a lower housing of the azimuth thruster and a second antenna mounted on an upper housing of the azimuth thruster, the lower housing being configured to rotate relative to the upper housing; and control transmission of the stored data from the first antenna in response to determining that the at least one criterion is satisfied.

The controller may be configured to: determine whether electrical power is transferred from a second inductor mounted on the upper housing to a first inductor mounted on the lower housing above a threshold electrical power to determine whether at least one criterion is satisfied.

The controller may be configured to determine whether an activation signal has been received to determine whether at least one criterion is satisfied.

The activation signal may be indicative of the first antenna and the second antenna defining a distance there between that is within a predetermined distance.

The controller may be configured to: determine whether storage capacity of the memory is below a threshold storage capacity; and control transmission of the stored data from the first antenna in response to determining that the storage capacity is below the threshold storage capacity.

The controller may be configured to control transmission of the stored data from the first antenna in response to determining that the storage capacity is below the threshold capacity while the first antenna and the second antenna are not aligned with one another.

The controller may be configured to: receive a data request signal; and control transmission of the stored data from the first antenna in response to receiving the data request signal.

The controller may be configured to control transmission of the stored data from the first antenna in response to receiving the data request signal while the first antenna and the second antenna are not aligned with one another.

The controller may be configured to time stamp the received data.

The received data may include operational condition data of the azimuth thruster.

The apparatus may further comprise memory configured to store data from at least the first sensor.

According to various, but not necessarily all, embodiments of the invention there is provided an azimuth thruster comprising apparatus as described in any of the preceding paragraphs.

The azimuth thruster may further comprise: a lower housing; an upper housing, the lower housing being configured to rotate relative to the upper housing; a first antenna mounted on the lower housing; a second antenna mounted on the upper housing; a first inductor mounted on a first part of the upper housing and configured to provide a magnetic field; and a second inductor mounted on a second part of the lower housing and configured to generate an electrical current from the magnetic field when the first part and the second part are at least partially aligned.

The first antenna may be positioned adjacent the first inductor and the second antenna is positioned adjacent the second inductor.

The first inductor may comprise a first resonant transformer, and the second inductor may comprise a second resonant transformer.

The azimuth thruster may further comprise an electrical energy storage device to store electrical energy from the second inductor.

The azimuth thruster may further comprise: a lower housing; an upper housing, the lower housing being configured to rotate relative to the upper housing; a first antenna mounted on the lower housing; a second antenna mounted on the upper housing; and a thermoelectric generator mounted on the lower housing and configured to generate electrical energy.

The azimuth thruster may further comprise an electrical energy storage device to store electrical energy from the thermoelectric generator.

According to various, but not necessarily all, embodiments of the invention there is provided a vessel comprising an azimuth thruster as described in any of the preceding paragraphs.

According to various, but not necessarily all, embodiments of the invention there provided a method for controlling transmission of data, the method comprising: receiving data from at least a first sensor within an azimuth thruster; controlling storage of the received data in memory; determining whether at least one criterion is satisfied, the at least one criterion varying with the relative positioning of a first antenna mounted on a lower housing of the azimuth thruster and a second antenna mounted on an upper housing of the azimuth thruster, the lower housing being configured to rotate relative to the upper housing; and controlling transmission of the stored data from the first antenna in response to determining that the at least one criterion is satisfied.

Determining whether at least one criterion is satisfied may include determining whether electrical power is transferred from a second inductor mounted on the upper housing to a first inductor mounted on the lower housing above a threshold electrical power.

Determining whether at least one criterion is satisfied may include determining whether an activation signal has been received.

The activation signal may be indicative of the first antenna and the second antenna defining a distance there between that is within a predetermined distance.

The method may further comprise: determining whether storage capacity of the memory is below a threshold storage capacity; and controlling transmission of the stored data from the first antenna in response to determining that the storage capacity is below the threshold storage capacity.

Controlling transmission of the stored data from the first antenna in response to determining that the storage capacity is below the threshold capacity may be performed while the first antenna and the second antenna are not aligned with one another.

The method may further comprise: receiving a data request signal; and controlling transmission of the stored data from the first antenna in response to receiving the data request signal.

Controlling transmission of the stored data from the first antenna in response to receiving the data request signal may be performed while the first antenna and the second antenna are not aligned with one another.

The method may further comprise time stamping the received data.

The received data may include operational condition data of the azimuth thruster.

According to various, but not necessarily all, embodiments of the invention there is provided a computer program that, when read by a computer, causes performance of the method as described in any of the preceding paragraphs.

According to various, but not necessarily all, embodiments of the invention there is provided a non-transitory computer readable storage medium comprising computer readable instructions that, when read by a computer, cause performance of the method as described in any of the preceding paragraphs.

According to various, but not necessarily all, embodiments of the invention there is provided apparatus to control transmission of data, the apparatus comprising means for performing the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 3A illustrates a plan view of an upper housing of an azimuth thruster according to various examples;

FIG. 3B illustrates a plan view of a lower housing of an azimuth thruster according to various examples;

DETAILED DESCRIPTION

In the following description, the terms 'fitted', 'connected' and 'coupled' mean operationally fitted, connected and coupled. It should be appreciated that there may be any number of intervening components between the mentioned features, including no intervening components.

Figure 1:
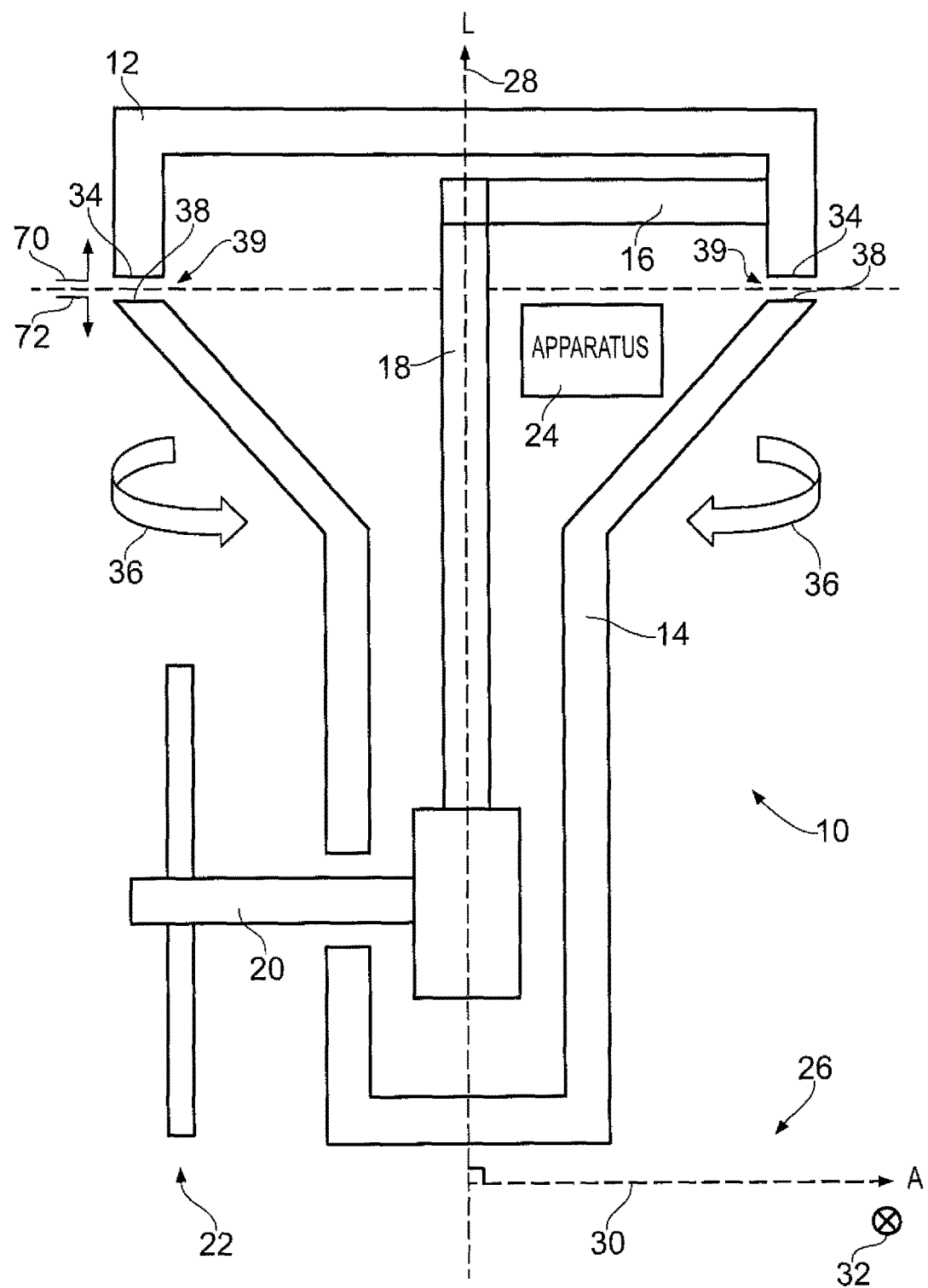
FIG. 1 illustrates a cross sectional side view of an azimuth thruster according to various examples.

FIG. 1 illustrates a cross sectional side view of an azimuth thruster 10 according to various examples. The azimuth thruster 10 comprises an upper housing 12, a lower housing 14, an input shaft 16, a vertical shaft 18, a propeller shaft 20, a propeller 22, and apparatus 24. FIG. 1 also illustrates a cylindrical coordinate system 26 including a longitudinal axis 28, a polar axis 30 and an azimuth 32 that are orthogonal to one another.

The upper housing 12 of the azimuth thruster may be coupled to a hull of a vessel and may be stationary relative to the hull. The upper housing 12 houses the input shaft 16 and a part of the vertical shaft 18. The upper housing 12 includes a first surface 34 that defines an annulus and is oriented perpendicular to the longitudinal axis 28 and parallel to the polar axis 30.

The lower housing 14 houses a part of the vertical shaft 18, and a part of the propeller shaft 20. The lower housing 14 of the azimuth thruster 10 is rotatable relative to the upper housing 12 about the longitudinal axis 28 as indicated by the arrows 36 (that is, along the azimuth 32). The lower housing 14 includes a second surface 38 that defines an annulus and is oriented perpendicular to the longitudinal axis 28 and parallel to the polar axis 30.

The upper housing 12 and the lower housing 14 are positioned so that the first surface 34 and the second surface 38 are adjacent to one another and define a gap 39 there between. The second surface 38 of the lower housing 14 is rotatable relative to the first surface 34 of the upper housing 12 and may rotate three hundred and sixty degrees relative to the first surface 34.

The input shaft 16, the vertical shaft 18, and the propeller shaft 22 may be coupled via suitable gears and form a drive train between an engine mounted in a hull of a vessel (not illustrated in FIG. 1) and the propeller 22. In operation, the engine provides torque to the drive train to rotate the propeller 22 and thereby propel and/or steer the vessel.

The apparatus 24 is positioned within at least the second housing 14 (in some examples, the apparatus 24 may be positioned within the first and second housings 12, 14), and is described in greater detail in the following paragraphs with reference to FIG. 2.

Figure 2:
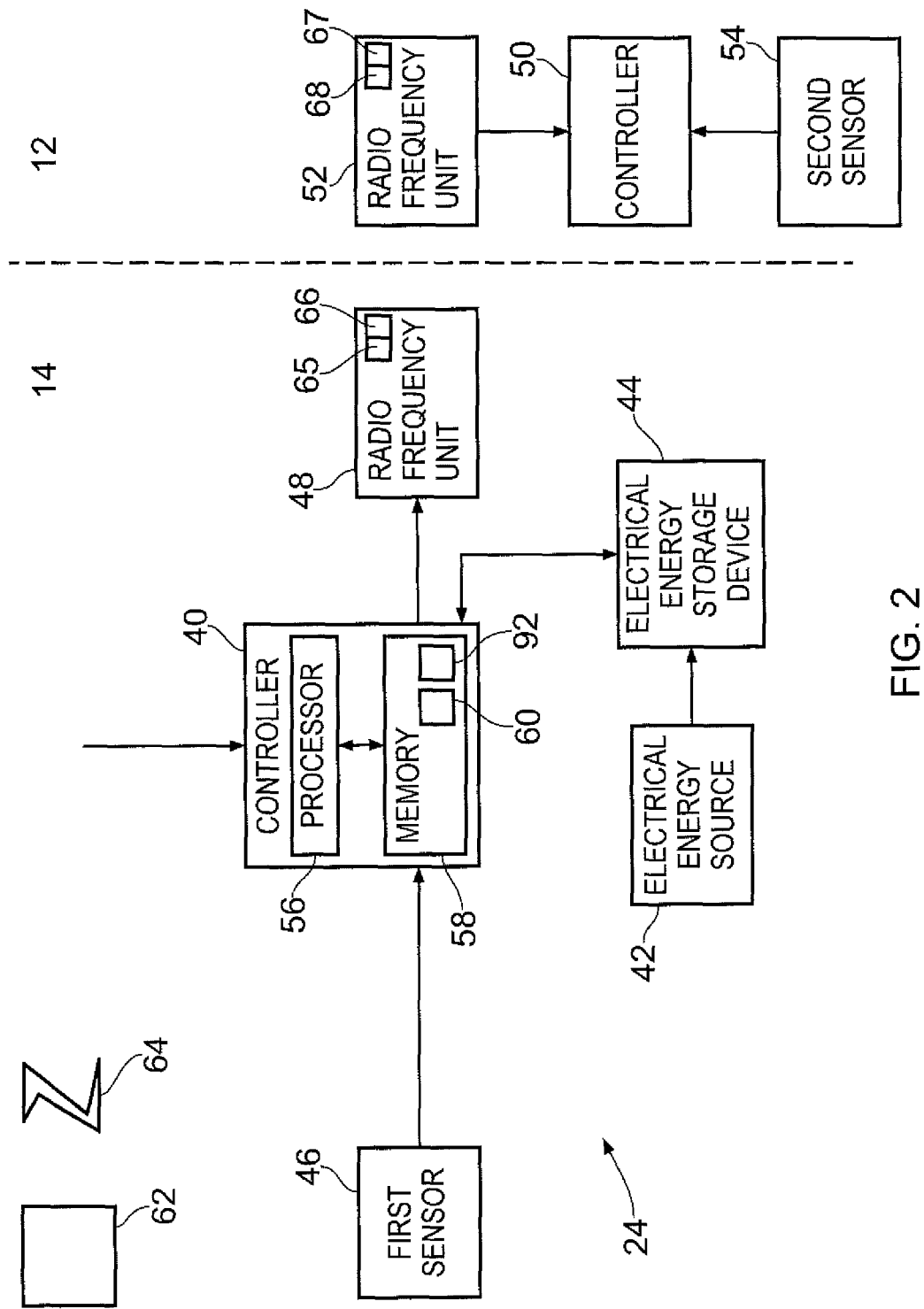
FIG. 2 illustrates a schematic diagram of apparatus for controlling transmission of data according to various examples.

FIG. 2 illustrates a schematic diagram of apparatus 24 for controlling transmission of data. The apparatus 24 includes a controller 40, an electrical energy source 42, an electrical energy storage device 44, a first sensor 46, a radio frequency unit 48, a further controller 50, a radio frequency unit 52 and a second sensor 54. The controller 40, the electrical energy source 42, the electrical energy storage device 44, the first sensor 46 and the radio frequency unit 48 may be positioned within, and/or mounted on, the second housing 14. The further controller 50, radio frequency receiver 52, and the second sensor 54 may be positioned within, and/or mounted on, the first housing 12.

In some examples, the apparatus 24 may be a module. As used herein, the wording 'module' refers to a device or apparatus where one or more features are included at a later time, and possibly, by another manufacturer or by an end user. For example, where the apparatus 24 is a module, the apparatus 24 may only include the controller 40, and the remaining features may be added by another manufacturer, or by an end user. By way of another example, where the apparatus 24 is a module, the apparatus 24 may only include the controller 40, the first sensor 46, the electrical energy source 42, the electrical energy storage device 44, and the radio frequency unit 48.

Figure 8:
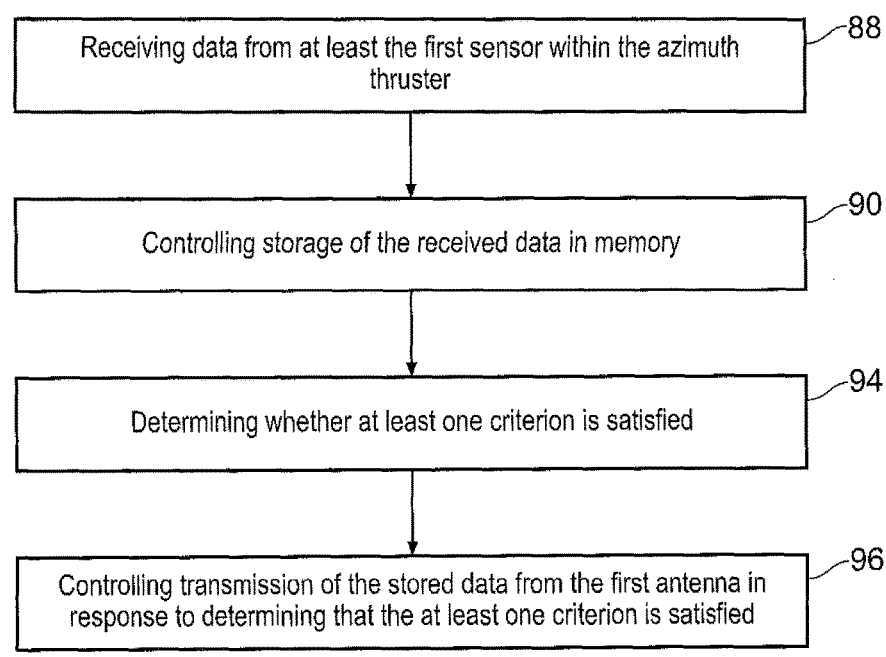
FIG. 8 illustrates a flow diagram of a method for controlling transmission of data according to various examples.
Figure 9:
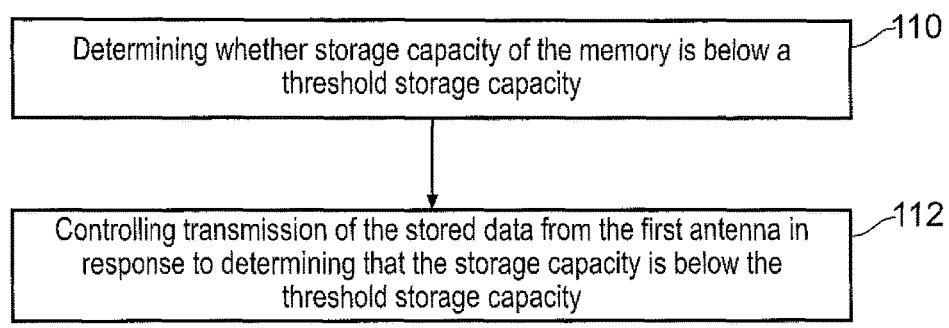
FIG. 9 illustrates a flow diagram of another method for controlling transmission of data according to various examples.
Figure 10:
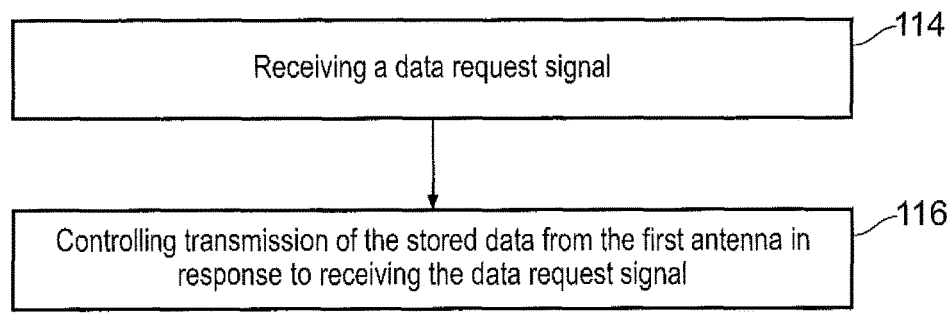
FIG. 10 illustrates a flow diagram of a further method for controlling transmission of data according to various examples.

The controller 40 may comprise any suitable circuitry to cause performance of the methods described herein and as illustrated in FIGS. 8, 9 and 10. The controller 40 may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

By way of an example, the controller 40 may comprise at least one processor 56 and at least one memory 58. The memory 58 stores a computer program 60 comprising computer readable instructions that, when read by the processor 56, causes performance of the methods described herein, and as illustrated in FIGS. 8, 9 and 10. The computer program 60 may be software or firmware, or may be a combination of software and firmware.

The processor 56 may include at least one microprocessor and may comprise a single core processor, may comprise multiple processor cores (such as a dual core processor, a quad core processor), or may comprise a plurality of processors (at least one of which may comprise multiple processor cores).

The memory 58 may be any suitable non-transitory computer readable storage medium, data storage device or devices, and may comprise a hard disk and/or solid state memory (such as flash memory). The memory 58 may be permanent non-removable memory, or may be removable memory (such as a universal serial bus (USB) flash drive).

The computer program 60 may be stored on a non-transitory computer readable storage medium 62. The computer program 60 may be transferred from the non-transitory computer readable storage medium 62 to the memory 58. The non-transitory computer readable storage medium 62 may be, for example, a secure digital (SD) memory card, a Universal Serial Bus (USB) flash drive, a compact disc (CD), a digital versatile disc (DVD) or a Blu-ray disc. In some examples, the computer program 60 may be transferred to the memory 58 via a signal 64 (such as a wireless signal or a wired signal).

Figure 4:
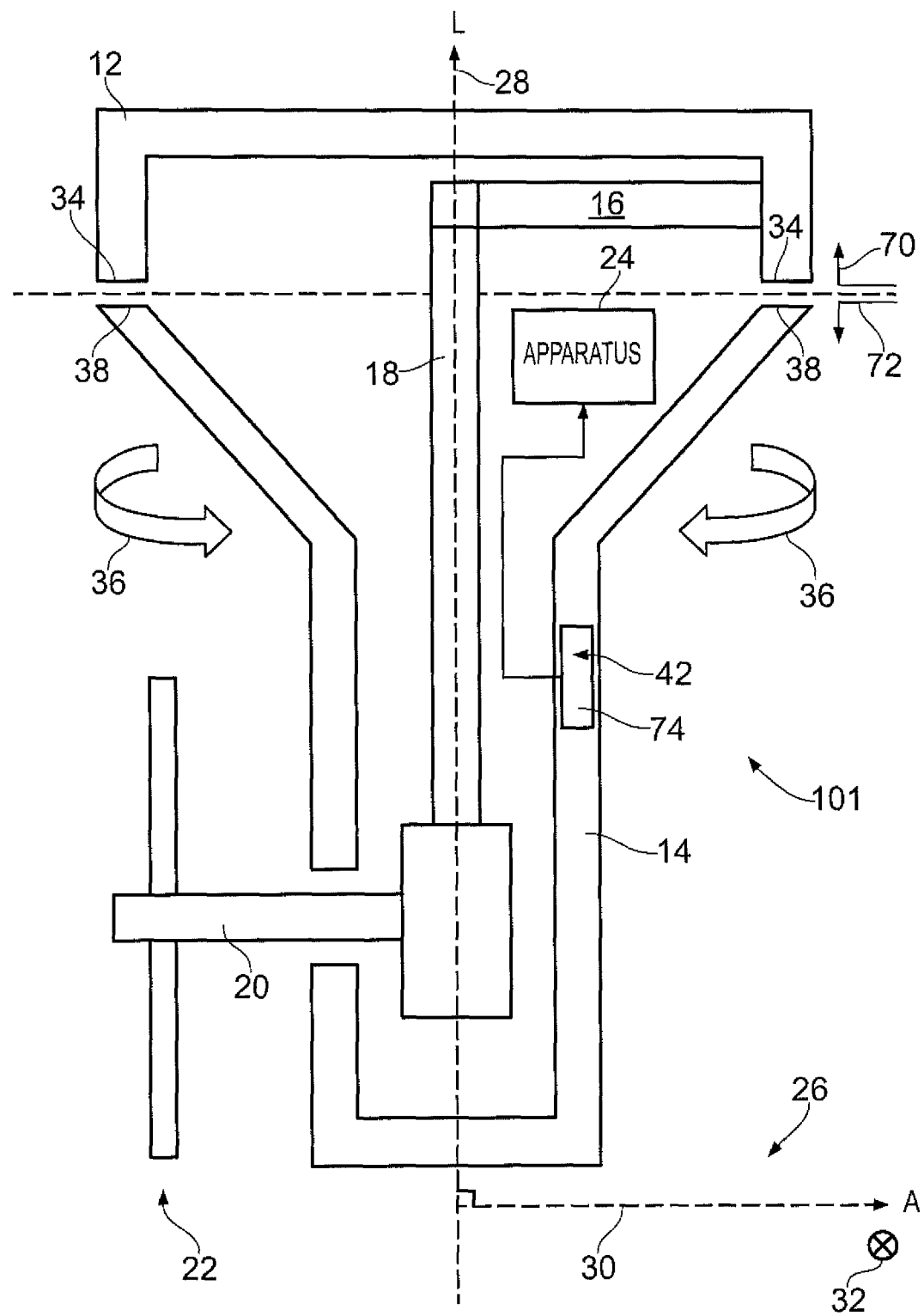
FIG. 4 illustrates a cross sectional side view of another azimuth thruster according to various examples.

The electrical energy source 42 may comprise any suitable apparatus, device or devices for providing electrical energy to the apparatus 24. For example, the electrical energy source 42 may comprise a thermoelectric generator (as illustrated in FIG. 4). By way of another example, the electrical energy source 42 may comprise an inductor arrangement for transferring electrical energy from the first housing 12 to the second housing 14 (as illustrated in FIGS. 5, 6A, 6B, and 6C). By way of a further example, the electrical energy source 42 may comprise slip rings or induction rings mounted around the vertical shaft 18 for transferring electrical energy.

The electrical energy storage device 44 may include any suitable device or devices for storing electrical energy. For example, the electrical energy storage device 44 may include at least one battery, and/or at least one supercapacitor. The electrical energy storage device 44 is arranged to supply electrical energy to the components of the apparatus 24. For example, the electrical energy storage device 44 may be arranged to supply electrical energy to the controller 40, the first sensor 46, and the radio frequency unit 48.

The first sensor 46 may be any suitable device or devices for sensing at least one operating condition of the azimuth thruster. For example, the first sensor 46 may comprise a device or devices for sensing vibration and/or temperature of at least a part of the azimuth thruster. The controller 40 is configured to receive data from the first sensor 46.

In various examples, the first sensor 46 may be arranged to measure vibration at four locations (that is, at bearings and gearboxes). The vibration sensors may be high data rate (high sample frequency, high resolution). The first sensor 46 may comprise thermal sensors, which may be low data rate (low frequency, low resolution). The first sensor 46 may include sensors for sensing acoustic waves, and/or oil quality, and/or oil pressure, and/or strain, and/or oil pressure. In some examples, the data for the at least one operating condition (for example, vibration and thermal data) may be measured continuously. In other examples, the data for the at least one operating condition may be sampled data and/or characteristic data and/or compressed data. Characteristic data can include a fast Fourier transform (FFT) of a frequency signal for example, or data indicating that certain temperatures have been exceeded.

The radio frequency unit 48 includes transmitter circuitry 65 and a first antenna 66. The radio frequency unit 48 may be configured to operate at any suitable frequency band and using any suitable protocol. For example, the radio frequency unit 48 may be configured to operate at 2.4 GHz, and/or 5 GHz and/or 60 GHz using a wireless local area network protocol (such as the WiFi standard). In other examples, different transmission frequencies may be used (even transmission frequencies outside the defined radio frequency bands, inside a sealed metal environment), or a unique protocol may be used instead of a commercial one. The transmitter circuitry 65 is coupled to the first antenna 66 and is configured to encode signals from the controller 40 and provide the encoded signals to the first antenna 66 for transmission. The radio frequency unit 48 may additionally include receiver circuitry coupled to the first antenna 66 for decoding signals received by the first antenna 66 and for providing the decoded signals to the controller 40. In some examples, the radio frequency unit 48 may comprise transceiver circuitry to provide both transmitter and receiver functionality.

FIG. 3A illustrates a plan view of the lower housing 14 of the azimuth thruster 10 as viewed along arrow 72 in FIG. 1. The second surface 38 of the lower housing 14 has a circular shape and the first antenna 66 is mounted on the second surface 38 at a position along the circumference and has an angular coordinate of φ1. It should be appreciated that since the lower housing 14 is rotatable relative to the upper housing 12, the angular coordinate of the first antenna 66 changes as the lower housing 14 rotates relative to the upper housing 12.

The controller 50 may comprise any suitable circuitry as described in the above paragraphs for the controller 40 and is therefore not described in any greater detail. The controller 50 may be positioned within the first housing 12 of the azimuth thruster 10, or within a part of a vessel to which the azimuth thruster 10 is fitted. In some examples, the controller 50 may be distributed between the first housing 12 of the azimuth thruster 10 and a vessel to which the azimuth thruster 10 is fitted.

The radio frequency unit 52 includes receiver circuitry 67 and a first antenna 68. The radio frequency unit 52 is configured to operate at the same frequency band and protocol as the radio frequency unit 48. For example, where the radio frequency unit 48 is configured to operate at 2.4 GHz using a wireless local area network protocol, the radio frequency unit 52 is also configured to operate at 2.4 GHz using the same wireless local area network protocol. The receiver circuitry 67 is coupled to the first antenna 68 and is configured to decode signals received by the first antenna 68 and to provide the decoded signals to the further controller 50. The radio frequency unit 52 may additionally include transmitter circuitry coupled to the first antenna 68 to encode signals from the further controller 50 and provide the encoded signals to the first antenna 68 for transmission. In some examples, the radio frequency unit 52 may comprise transceiver circuitry to provide both transmitter and receiver functionality.

FIG. 3B illustrates a plan view of the upper housing 12 of the azimuth thruster 10 as viewed along arrow 70 in FIG. 1. The first surface 34 of the upper housing 12 has a circular shape and the second antenna 68 is mounted on the first surface 34 at a position along the circumference and has an angular coordinate of φ2. As illustrated in FIGS. 3A and 3B, the first antenna 66 and the second antenna 68 overlay one another when the azimuth thruster 10 is viewed in plan and define a minimum distance there between (one millimeter to ten millimeters for example).

As the lower housing 14 rotates relative to the upper housing 12, the first antenna 66 moves away from the position illustrated in FIG. 3A and the distance to the second antenna 68 from the first antenna 66 increases.

Figure 3C:
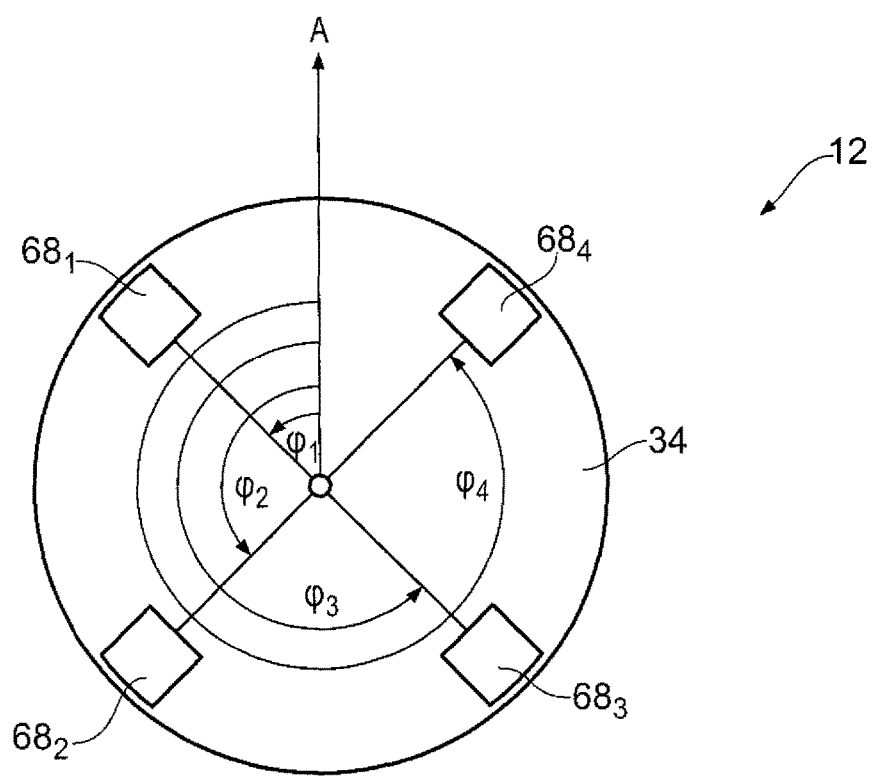
FIG. 3C illustrates a plan view of another upper housing of an azimuth thruster according to various examples.

In other examples, a plurality of antennas 68 may be mounted on the first surface 34 of the upper housing 14 and connected to the transmitter circuitry 67. For example, FIG. 3C illustrates a plan view of an alternative upper housing 12 of the azimuth thruster 10 as viewed along arrow 70 in FIG. 1. The first surface 34 of the upper housing 12 has a circular shape and a plurality of antennas $68_1$, $68_2$, $68_3$, $68_4$ are mounted on the first surface 34 at positions along the circumference and have different angular coordinates. In more detail, a first antenna $68_1$ has an angular coordinate of φ1 (forty five degrees for example), a second antenna $68_2$ has an angular coordinate of φ2 (one hundred and thirty five degrees for example), a third antenna $68_3$ has an angular coordinate of φ3 (two hundred and twenty five degrees for example), and a fourth antenna $68_4$ has an angular coordinate of φ4 (three hundred and fifteen degrees for example).

Returning to FIG. 2, the second sensor 54 is configured to sense the position of the lower housing 14 relative to the upper housing 12 and provide the sensed position to the controller 50. The second sensor 54 may include any suitable apparatus or device for sensing the position of the lower housing 14 and may include stepper motor control feedback where the number of steps is used to deduce position, or the detection of features in the structure, to indicate position (detection of features may be performed using an image sensor and image recognition, or may be performed using a sensor that physically senses the features in the structure). In one example, the steering angle (azimuth angle) of the azimuth thruster 10 is measured and generated in a transmitter box that is located at the top of a steering cover of the azimuth thruster 10. The transmitter box is arranged to mechanically measure the steering angle of the azimuth thruster 10. An azimuth steering signal (an analog signal) is transmitted to an azimuth control unit (ACU). The azimuth steering signal is transmitted from the azimuth control unit (ACU) or direct from the transmitter box to the condition monitoring cabinet (CMU XCM1). The transmitter box may also include control pitch angle (CP) devices.

The further controller 50 is configured to receive the sensed position of the lower housing 14 and may be configured to control a display to display the sensed position to enable an operator to determine the direction of thrust provided by the azimuth thruster 10.

FIG. 4 illustrates a cross sectional side view of another azimuth thruster 101. The azimuth thruster 101 is similar to the azimuth thruster 10 and where the features are similar, the same reference numerals are used. In this example, the electrical energy source 42 includes a thermoelectric generator 74 mounted on the lower housing 14 of the azimuth thruster 101.

In operation, the thermoelectric generator 74 is positioned beneath the water level and generates electrical energy from the temperature difference between the temperature of the water and the interior temperature of the azimuth thruster 101, which is usually filled with hot oil (which may have a temperature of forty to sixty Celsius). The electrical energy storage device 44 receives and stores the electrical energy generated by the thermoelectric generator 74.

Figure 5:
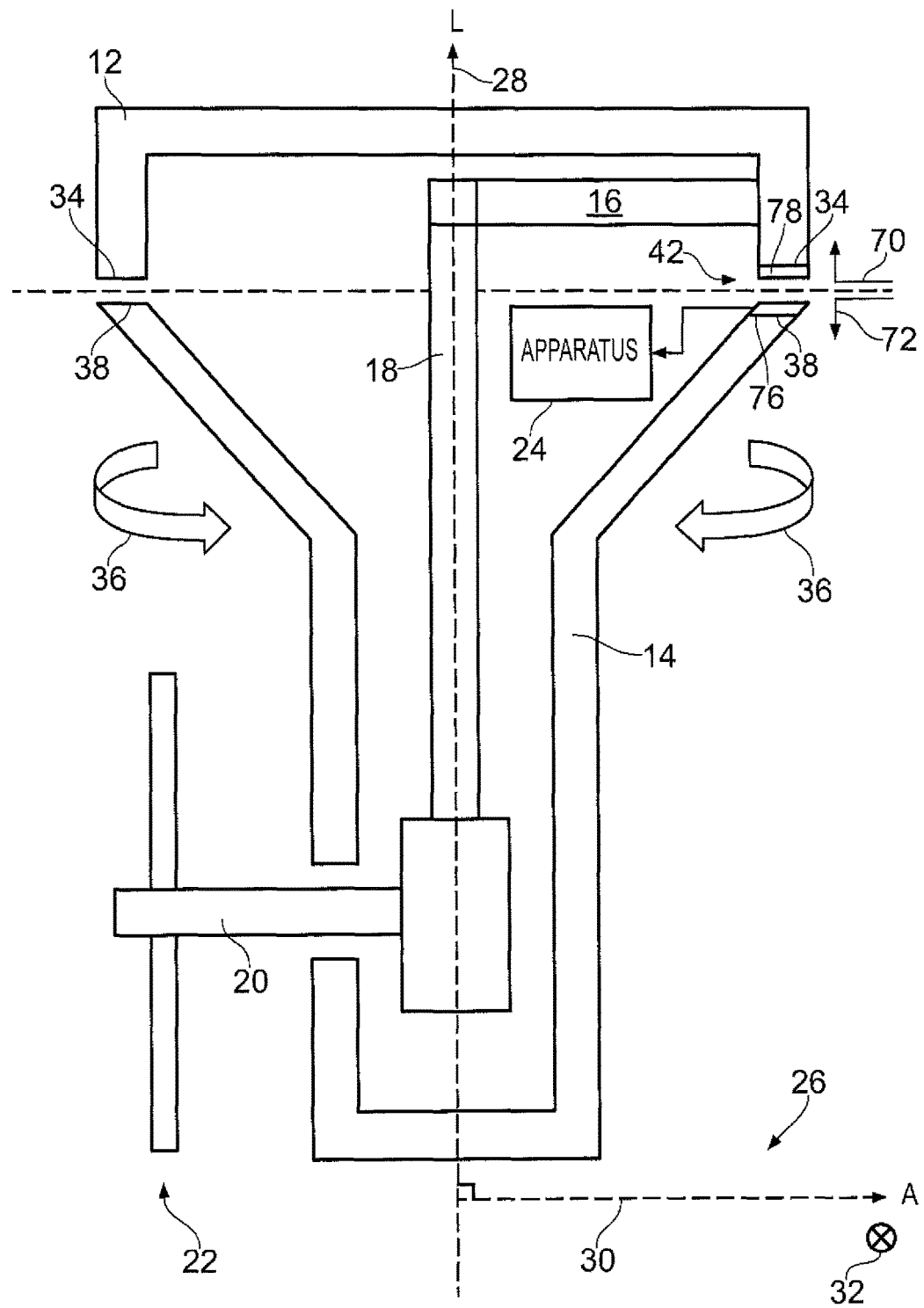
FIG. 5 illustrates a cross sectional side view of a further azimuth thruster according to various examples.

FIG. 5 illustrates a cross sectional side view of a further azimuth thruster 102. The azimuth thruster 102 is similar to the azimuth thruster 10 and the azimuth thruster 101 and where the features are similar, the same reference numerals are used. In this example, the electrical energy source 42 comprises a plurality of inductors for transferring electrical energy from the upper housing 12 side of the azimuth thruster 102 to the lower housing 14 side of the azimuth thruster 102.

Figure 6B:
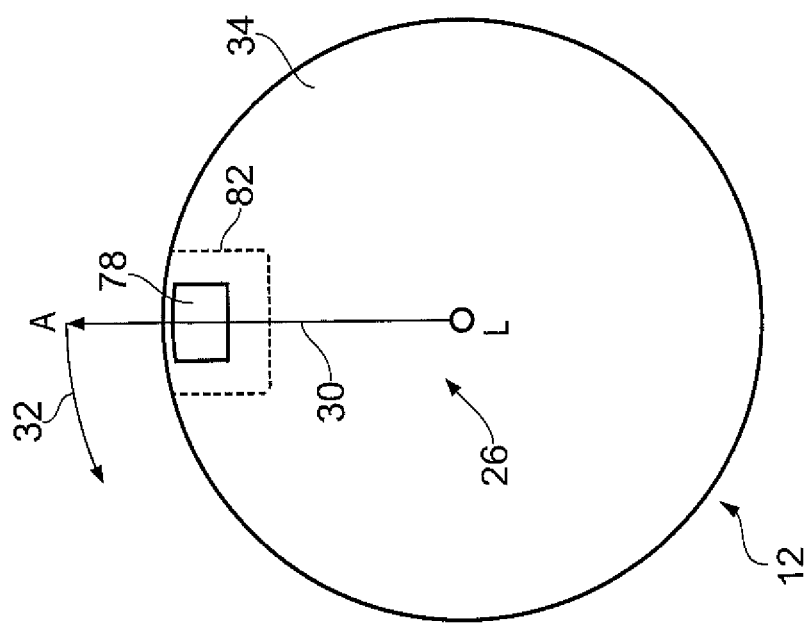
FIG. 6B illustrates a plan view of the upper housing of the azimuth thruster illustrated in FIG. 5.

In more detail, the electrical energy source 42 includes a first inductor 76 and a second inductor 78. As illustrated in FIG. 6B, the second inductor 78 is positioned on a second part 82 of the first surface 34 and is arranged to provide a magnetic field. The second part 82 is a portion of the first surface 34 and consequently has a smaller surface area than the first surface 34. Additionally, the second part 82 extends along a portion of the perimeter of the first surface 34 (the second part 82 extends along an arc of the circumference of first surface 34 illustrated in FIG. 6B) and therefore spans a range of angular coordinates.

The second inductor 78 may have any suitable shape and structure and may include a conductor (such as an enamel insulated copper conductor) coiled around a core (such as laminated sheets of annealed silicon steel, with grain orientation in the direction of magnetic flux flow). In some examples, the second inductor 78 may comprise a resonant transformer, operating at higher frequencies (MHz for example), with inductor & capacitor circuitry (LC circuits)

with the same resonant operational frequency bands in the first and second inductors 76, 78, where no steel core may be required. Resonant transformers may be more efficient and may not suffer from attractive forces between the primary and secondary parts of the power transfer device.

The second inductor 78 and the second antenna 68 may be housed together within a cover and/or mounted together on the same base. Consequently, the second antenna 68 may also be positioned on the second part 82 of the first surface 34. In other examples, the second inductor 78 and the second antenna 68 may be separate to one another, may have separate covers, and define a gap there between.

Figure 6A:
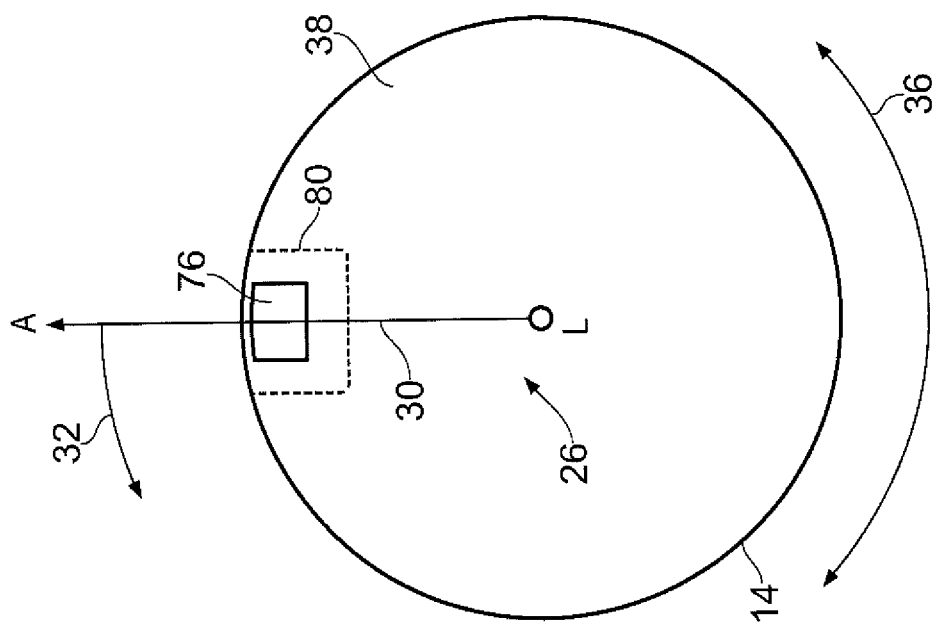
FIG. 6A illustrates a plan view of the lower housing of the azimuth thruster illustrated in FIG. 5.

As illustrated in FIG. 6A, the first inductor 76 is positioned on a first part 80 of the second surface 38 and is arranged to generate an electrical current from the magnetic field (generated by the second inductor 78) when the first part 80 and the second part 82 are at least partially aligned. In other words, the first inductor 76 and the second inductor 78 form a transformer when the first part 80 and the second part 82 are at least partially aligned. The first inductor 76 and the second inductor 78 may be at least partially aligned and form a transformer when they at least partially overlap one another when viewed in plan. In other words, the first inductor 76 and the second inductor 78 may be at least partially aligned and form a transformer when at least one angular coordinate of the first part 80 is the same as an angular coordinate of the second part 82.

The first part 80 is a portion of the second surface 38 and consequently has a smaller surface area than the second surface 38. Additionally, the first part 80 extends along a portion of the perimeter of the second surface 38 (the first part 80 extends along an arc of the circumference of second surface 38 illustrated in FIG. 6A) and therefore spans a range of angular coordinates.

The first inductor 76 may have any suitable shape and structure and may include a conductor (such as an enamel insulated copper conductor) coiled around a core (such as laminated sheets of annealed silicon steel, with grain orientation in the direction of magnetic flux flow). The first inductor 76 may be coupled to an alternating current source. In some example, the first inductor 76 may comprise a resonant transformer (which may also be referred to as a magnetic resonator), and where the second inductor 78 also comprises a resonant transformer, the first inductor 76 and the second inductor 78 may transfer electrical energy via resonant inductive coupling (which may also be referred to as electrodynamic induction).

The first inductor 76 and the first antenna 66 may be housed together within a cover and/or mounted together on the same base. Consequently, the first antenna 66 may also be positioned on the first part 80 of the second surface 38. In other examples, the first inductor 76 and the first antenna 66 may be separate to one another, have separate covers, and define a gap there between.

The first inductor 76 may be coupled to an electronic component (such as radio frequency circuitry, and/or an electrical energy storage device for example) to provide the generated electrical current to the electronic component. In some examples, the second inductor 78 is coupled to an electronic component via an alternating current to direct current (AC/DC) converter, and a filter (such as a diode rectifier and capacitor).

Where the azimuth thruster 102 is fitted to a vessel, the positioning of the first and second parts 80, 82 may be selected so that when the first and second parts 80, 82 are aligned, the azimuth thruster 102 is oriented to propel the vessel in a forwards direction (that is, the direction of thrust provided by the azimuth thruster 102 is parallel to the longitudinal axis of the vessel).

Figure 6C:
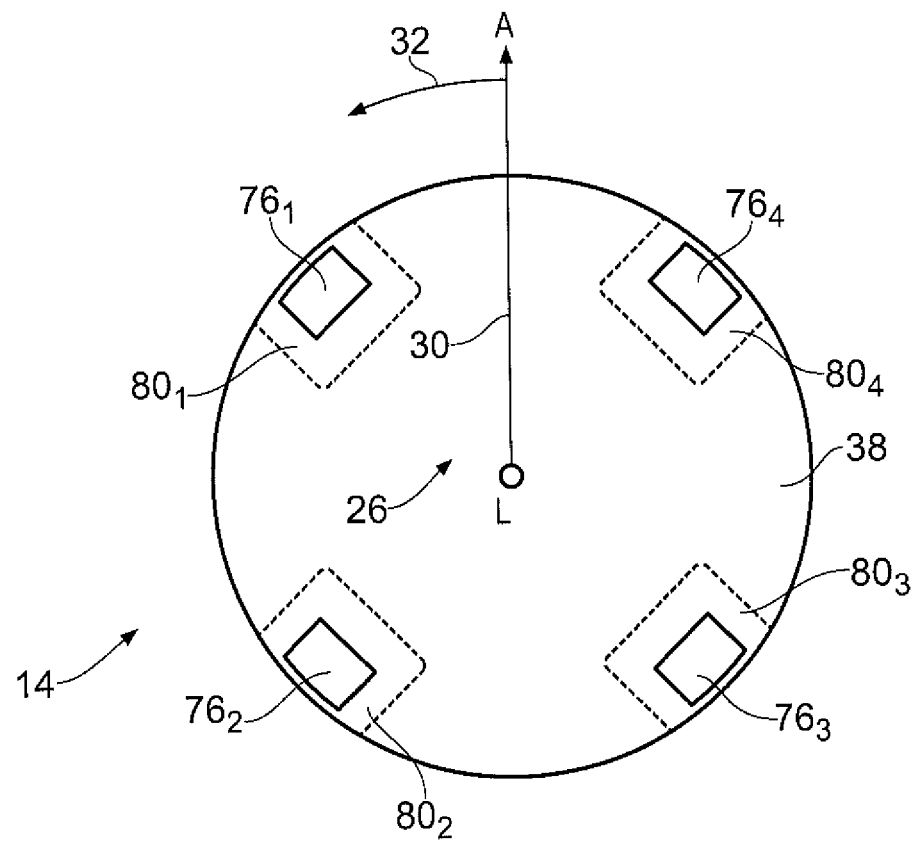
FIG. 6C illustrates a plan view of an alternative lower housing of the azimuth thruster illustrated in FIG. 5.

In some examples and as illustrated in FIG. 6C, the electrical energy source 42 may comprise a plurality of inductors $76_1$, $76_2$, $76_3$, $76_4$, that are positioned on separate parts $80_1$, $80_2$, $80_3$, $80_4$ of the second surface 38 respectively. The parts $80_1$, $80_2$, $80_3$, $80_4$ may be spaced equidistantly around the perimeter of the first surface 34 and may define gaps there between. In other words, the parts $80_1$, $80_2$, $80_3$, $80_4$ may have different angular coordinates to one another. Consequently, where the second surface 38 is circular (for example), the sum of the arcs of the parts $80_1$, $80_2$, $80_3$, $80_4$ may be less than the circumference of the second surface 38.

In other examples, a plurality of inductors may additionally or alternatively be positioned on the first surface 34 since the first surface 34 may be easier to access should there be a maintenance requirement for the inductors. Additionally, the plurality of inductors may be arranged in a non-equidistant arrangement. For example, three inductors may be positioned at quarter segment arcs and near the position required for forward or near forward thrust. Furthermore, in some examples at least some of the parts $80_1$, $80_2$, $80_3$, $80_4$ may not define gaps there between and those parts may share at least one angular coordinate.

This arrangement may be advantageous in that it may enable electrical energy to be supplied between the upper and lower housings 12, 14 for a plurality of different orientations of the lower housing 14 relative to the upper housing 12. Where the azimuth thruster 102 is fitted to a vessel such as a tug boat (where the azimuth thruster 102 may be used frequently in a multitude of different directions), the arrangement illustrated in FIG. 6C may be advantageous in that it may enable the transfer of electrical energy for multiple different orientations of the azimuth thruster 102.

In operation, as the second surface 38 rotates relative to the first surface 34, at least one of the plurality of inductors $76_1$, $76_2$, $76_3$, $76_4$ generates an electrical current from the magnetic field (generated by the second inductor 78) when the first part 80, and one of the parts $82_1$, $82_2$, $82_3$, $82_4$ of the first surface 36, are at least partially aligned.

Figure 7:
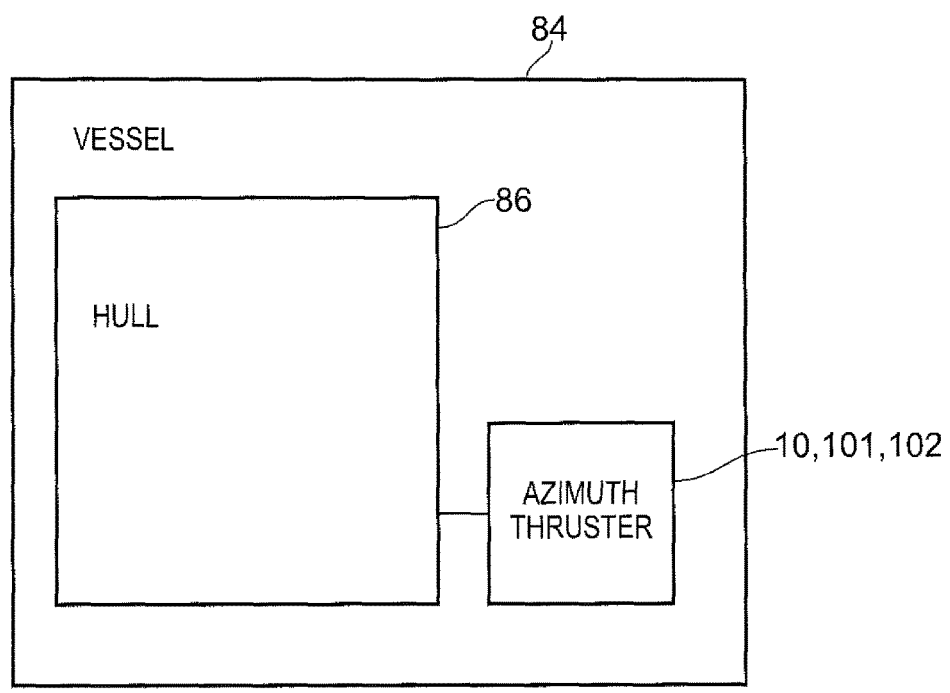
FIG. 7 illustrates a schematic diagram of a vessel according to various examples.

FIG. 7 illustrates a schematic diagram of a vessel 84 according to various examples. The vessel 84 may be any vessel for traversing an expanse of water. For example, the vessel 84 may be a cargo ship, a passenger vessel (such as a ferry), harbour work craft (such as a tug boat), or a fishing vessel. The vessel 84 may also be any vessel for maintaining a fixed position on an expanse of water relative to land. For example, the vessel 84 may be an offshore oil platform.

The vessel 84 comprises a hull 86 and one or more azimuth thrusters 10, 101, 102 that are coupled to the hull 86. In some examples, the vessel 84 may comprise a plurality of azimuth thrusters 101 as illustrated in FIG. 4 or a plurality of azimuth thrusters 102 as illustrated in FIG. 5. In further examples, the vessel 84 may comprise one or more azimuth thrusters 101 and one or more azimuth thrusters 102.

FIG. 8 illustrates a flow diagram of a method for controlling transmission of data according to various examples. At block 88, the method includes receiving data from at least the first sensor 46 within the azimuth thruster 10, 101, 102. For example, the controller 40 may receive operational condition data of the azimuth thruster 10, 101, 102 from the first sensor 46. Block 88 may be performed continuously, or may be performed periodically.

At block 90, the method includes controlling storage of the received data in memory. For example, the controller 40 may control storage of the data received at block 88 in the memory 58 as stored data 92 (illustrated FIG. 2). Block 90 may be performed continuously (for example, the controller 40 may continuously store a continuous stream of data from the first sensor 46). Alternatively, block 90 may be performed periodically. For example, the controller 40 may buffer continuously received data from the first sensor 46 and then store the received data periodically in the memory 58. By way of another example, the controller 40 may periodically control storage of the received data where the controller 40 periodically receives data from the first sensor 46.

The controller 40 may be configured to store the received data in the memory 58 as a single data file. Alternatively, the controller 40 may be configured to store the received data in the memory 58 as a plurality of data files. For example, the plurality of data files may each be of the order of tens of megabytes in size.

The controller 40 may be configured to time stamp the data when the data is stored in the memory 58 at block 90. Alternatively, dedicated time stamping circuitry may be configured to time stamp the data when the data is stored in the memory 58 at block 90. This means the stored data can be co-ordinated with on-board data like speed signals, which may also comprise a time stamp. The time-stampers may be periodically co-ordinated to handle thermal drift.

At block 94, the method includes determining whether at least one criterion is satisfied. The at least one criterion varies with the relative positioning of the first antenna 66 mounted on a lower housing 14 of the azimuth thruster 10, 101, 102 and the second antenna 68 mounted on the upper housing 12 of the azimuth thruster 10, 101, 102.

To determine whether the at least one criterion is satisfied, the controller 40 may be configured to determine whether electrical power is transferred from the second inductor 78 mounted on the upper housing 12 to the first inductor 76 mounted on the lower housing 14 above a threshold electrical power. For example, the controller 40 may monitor the electrical power output by the first inductor 76 to determine whether the transferred electrical power is above the threshold electrical power. Alternatively or additionally, the controller 40 may monitor the charge rate of the electrical energy storage device 44 to determine whether the transferred electrical power is above the threshold electrical power.

Where the first antenna 66 is positioned adjacent the first inductor 76 and the second antenna 68 is positioned adjacent the second inductor 78, the determination that the electrical power output by the first inductor 76 is above the threshold electrical power is indicative that the first antenna 66 and the second antenna 68 define a distance there between that is within a predetermined distance. The predetermined distance may be defined as the maximum distance where the radio frequency unit 48 may efficiently transmit a wireless signal to the radio frequency unit 52 so that the radio frequency unit 52 receives the wireless signal with a minimum acceptable signal strength. In other examples, the predetermined distance may be defined as the maximum distance between the first and second antennas 66, 68 where they at least partially overlap when viewed in plan (that is, where the first and second antennas 66, 68 share at least one angular coordinate). In further examples, the predetermined distance may be defined by the manufacturer of the azimuth thruster 10, 101, 102. In some examples, the controller 40 may be configured to determine whether electrical power is being transferred from the second inductor 78 to the first inductor 76 at a maximum power level in order to determine whether the first antenna 66 and the second antenna 68 wholly overlap and thereby satisfy the at least one criterion. Where the electrical power being transferred reaches a maximum, the controller 40 determines that the first and second antennas 66, 68 fully overlap and that the criterion is therefore satisfied.

Additionally or alternatively, the controller 40 may be configured to determine whether an activation signal has been received to determine whether the at least one criterion is satisfied. The activation signal may be indicative of the first antenna 66 and the second antenna 68 defining a distance there between that is within a predetermined distance (for example, where the first and second antennas 66, 68 at least partially overlap when viewed in plan).

For example, the further controller 50 may receive a sensed position of the lower housing 14 relative to the upper housing 12 from the second sensor 54. The further controller 50 uses the sensed position of the lower housing 14 to determine the distance between the first antenna 66 and the second antenna 68. Where the determined distance is equal to or less than the predetermined distance, the further controller 50 controls the radio frequency unit 52 (which includes a transmitter or a transceiver in this example) to transmit an activation signal. The radio frequency unit 48 (which includes a receiver or a transceiver in this example) receives the activation signal and provides the activation signal to the controller 40. Where the determined distance is greater than the predetermined distance, the further controller 50 does not control the radio frequency unit 52 to transmit an activation signal.

By way of another example, the further controller 50 may read the angular position of the lower housing 14 relative to the upper housing 12 from a controlled area network (CAN-Bus) of the vessel 84 and then determine the distance between the first antenna 66 and the second antenna 68 using the read angular position. Where the determined distance is equal to or less than the predetermined distance, the further controller 50 controls the radio frequency unit 52 (which includes a transmitter or a transceiver in this example) to transmit an activation signal. The radio frequency unit 48 (which includes a receiver or a transceiver in this example) receives the activation signal and provides the activation signal to the controller 40. Where the determined distance is greater than the predetermined distance, the further controller 50 does not control the radio frequency unit 52 to transmit an activation signal and the method repeats block 94.

At block 96, the method includes controlling transmission of the stored data 92 from the first antenna 66 in response to determining that the at least one criterion is satisfied. For example, the controller 40 may determine that the electrical power transferred from the second inductor 78 to the first inductor 76 is above the threshold electrical power, and in response to that determination, control the radio frequency unit 48 to transmit the stored data 92 from the first antenna 66. By way of another example, the controller 40 may determine that an activation signal has been received and in response to that determination, control the radio frequency unit 48 to transmit the stored data 92 from the first antenna 66.

The method then returns to block 94 so that the controller 40 may determine when to control the radio frequency unit 48 to transmit stored data 92.

The apparatus 24 may be advantageous in that operational condition data of the azimuth thruster 10, 101, 102 may be obtained and stored by the controller 40 in the memory 58 over a period of time. The stored data 92 may then be efficiently transmitted out of the lower housing 14 of the azimuth thruster 10, 101, 102 when the first antenna 66 and the second antenna 68 are positioned relatively close to one another (that is, within a predetermined distance). The efficient transfer of data from the first antenna 66 to the second antenna 68 may enable the apparatus 24 to comprise a relatively small electrical energy storage device 44 and may reduce the cost of the apparatus 24. Alternatively, the apparatus 24 may enable stored data 92 to be continuously transferred to the radio frequency unit 52 for a longer period of time because the radio frequency unit 48 may use less electrical power.

FIG. 9 illustrates a flow diagram of another method for controlling transmission of data according to various examples. At block 110, the method includes determining whether storage capacity of the memory 58 is below a threshold storage capacity. For example, the memory 58 may have a storage capacity of one hundred gigabytes and the threshold storage capacity may be where the memory 58 has ten gigabytes of storage capacity remaining. In this example, the controller 40 is configured to determine whether the storage capacity of the memory 58 is below ten gigabytes.

At block 112, the method includes controlling transmission of the stored data 92 from the first antenna 66 in response to determining that the stored capacity is below the threshold storage capacity. For example, the controller 40 may control the radio frequency unit 48 to transmit all of the stored data 92 to empty the memory 58. By way of another example, the controller 40 may control the radio frequency unit 48 to transmit only a portion of the stored data 92 to partially empty the memory 58.

The controller 40 may control the transmission of the stored data 92 irrespective of the distance between the first and second antennas 66, 68. In other words, the controller 40 may control the transmission of the stored data 92 when the first and second antennas 66, 68 are not in proximity to one another (that is, the first and second antennas 66, 68 define a distance there between that is greater than the predetermined distance) and when the first and second antennas 66, 68 are in proximity to one another (that is, the distance between the first and second antennas 66, 68 is equal to or less than the predetermined distance). Where the controller 40 determines that the first and second antennas 66, 68 are not in proximity to one another, the controller 40 may reduce the power of the wireless signal transmitted by the first antenna 66 to reduce the effect of multipath distortion (by utilising the higher attenuation effect of oil, to reduce the strength of the reflections taking a longer path).

The method illustrated in FIG. 9 is advantageous in that it may prevent the memory 58 from running out of storage capacity and being unable to store data from the first sensor 46. Consequently, the method may improve the integrity of the stored data 92.

FIG. 10 illustrates a flow diagram of a further method for controlling transmission of data according to various examples.

At block 114, the method includes receiving a data request signal. Where the radio frequency unit 48 includes receiver circuitry or a transceiver, the controller 40 may receive a data request signal via the radio frequency unit 48. The data request signal may originate from the Bridge of the vessel 84 where a crew member requests transmission of the stored data 92 from the azimuth thruster 10, 101, 102. The request could also come from the manufacturer, who, having reviewed data from a previous upload and spotted an anomaly, wants all of the up-to date data. In addition, the in thruster unit (that is, the controller 40) could decide that it has spotted an anomaly worthy of immediate data upload and send a subset or all of the data for further analysis by a greater computing and analysis capability in the vessel (e.g. Artificial Intelligence), the ship owner or manufacturer (this could be at an off-board location).

At block 116, the method includes controlling transmission of the stored data from the first antenna 66 in response to receiving the data request signal. For example, the controller 40 may control the radio frequency unit 48 to transmit the stored data 92 in response to determining that the data request signal has been received. It should be appreciated that the controller 40 may control the radio frequency unit 48 to transmit all of the stored data 92, or may control the radio frequency unit 48 to transmit only a portion of the stored data 92 (where the portion of stored data 92 may be selected by the controller 40 using information in the data request signal).

It should be appreciated that in block 116, the controller 40 may control the transmission of the stored data 92 irrespective of the distance between the first and second antennas 66, 68 (that is, when the first and second antennas 66, 68 are not in proximity to one another and when the first and second antennas 66, 68 are in proximity to one another). Where the controller 40 determines that the first and second antennas 66, 68 are not in proximity to one another, the controller 40 may reduce the power of the wireless signal transmitted by the first antenna 66 to reduce the effect of multipath distortion.

The method illustrated in FIG. 10 is advantageous in that it may allow stored data 92 to be transmitted out of the azimuth thruster on demand. This may be useful where the crew of the vessel 84 urgently need to know the operational condition of the azimuth thruster 10, 101, 102.

It will be understood that the invention is not limited to the embodiments above-described and various modifications and improvements can be made without departing from the concepts described herein. For example, the apparatus 24 may be included within other rotating thruster systems where it is desirable to obtain data from a rotating frame. For example, the apparatus 24 may be implemented within a tunnel thruster or a rudder.

Except where mutually exclusive, any of the features may be employed separately or in combination with any other features and the disclosure extends to and includes all combinations and sub-combinations of one or more features described herein.

The invention claimed is:

1. Apparatus to control transmission of data, the apparatus comprising:
   a controller configured to:
   receive data from at least a first sensor within an azimuth thruster;
   control storage of the received data in memory;
   determine whether at least one criterion is satisfied, the at least one criterion varying with the relative positioning of a first antenna mounted on a lower housing of the azimuth thruster and a second antenna mounted on an upper housing of the azimuth thruster, the lower housing being configured to rotate relative to the upper housing; and
   control transmission of the stored data from the first antenna in response to determining that the at least one criterion is satisfied,
   wherein the controller is configured to: determine whether electrical power is transferred from a second inductor mounted on the upper housing to a first inductor mounted on the lower housing above a threshold electrical power to determine whether at least one criterion is satisfied.

2. Apparatus as claimed in claim 1, wherein the controller is configured to: determine whether storage capacity of the memory is below a threshold storage capacity; and control transmission of the stored data from the first antenna in response to determining that the storage capacity is below the threshold storage capacity.

3. Apparatus as claimed in claim 2, wherein the controller is configured to control transmission of the stored data from the first antenna in response to determining that the storage capacity is below the threshold capacity while the first antenna and the second antenna are not aligned with one another.

4. Apparatus as claimed in claim 1, wherein the controller is configured to: receive a data request signal; and control transmission of the stored data from the first antenna in response to receiving the data request signal.

5. Apparatus as claimed in claim 4, wherein the controller is configured to control transmission of the stored data from the first antenna in response to receiving the data request signal while the first antenna and the second antenna are not aligned with one another.

6. Apparatus as claimed in claim 1, wherein the controller is configured to time stamp the received data.

7. The azimuth thruster comprising the apparatus as claimed in claim 1.

8. An azimuth thruster as claimed in claim 7, further comprising:
the lower housing;
the upper housing, the lower housing being configured to rotate relative to the upper housing;
the first antenna mounted on the lower housing;
the second antenna mounted on the upper housing;
the first inductor mounted on a first part of the lower housing;
the second inductor mounted on a second part of the upper housing and configured to provide a magnetic field; and
wherein the first inductor is configured to generate an electrical current from the magnetic field when the first part and the second part are at least partially aligned.

9. An azimuth thruster as claimed in claim 8, wherein the first antenna is positioned adjacent the first inductor and the second antenna is positioned adjacent the second inductor.

10. An azimuth thruster as claimed in claim 8, wherein the first inductor forms part of a first resonant transformer, and the second inductor forms part of a second resonant transformer.

11. An azimuth thruster as claimed in claim 8, further comprising an electrical energy storage device to store electrical energy from the second inductor.

12. An azimuth thruster as claimed in claim 7, further comprising:
the lower housing;
the upper housing, the lower housing being configured to rotate relative to the upper housing;
the first antenna mounted on the lower housing;
the second antenna mounted on the upper housing; and
a thermoelectric generator mounted on the lower housing and configured to generate electrical energy.

13. An azimuth thruster as claimed in claim 12, further comprising an electrical energy storage device to store electrical energy from the thermoelectric generator.

14. A method for controlling transmission of data, the method comprising:
receiving data from at least a first sensor within an azimuth thruster;
controlling storage of the received data in memory;
determining whether at least one criterion is satisfied, the at least one criterion varying with the relative positioning of a first antenna mounted on a lower housing of the azimuth thruster and a second antenna mounted on an upper housing of the azimuth thruster, the lower housing being configured to rotate relative to the upper housing; and
controlling transmission of the stored data from the first antenna in response to determining that the at least one criterion is satisfied,
wherein determining whether at least one criterion is satisfied includes determining whether electrical power is transferred from a second inductor mounted on the upper housing to a first inductor mounted on the lower housing above a threshold electrical power.

15. A method as claimed in claim 14, further comprising: determining whether storage capacity of the memory is below a threshold storage capacity; and controlling transmission of the stored data from the first antenna in response to determining that the storage capacity is below the threshold storage capacity.

16. A method as claimed in claim 15, wherein controlling transmission of the stored data from the first antenna in response to determining that the storage capacity is below the threshold capacity is performed while the first antenna and the second antenna are not aligned with one another.

17. A method as claimed in claim 14, further comprising: receiving a data request signal; and controlling transmission of the stored data from the first antenna in response to receiving the data request signal.

18. A method as claimed in claim 17, wherein controlling transmission of the stored data from the first antenna in response to receiving the data request signal is performed while the first antenna and the second antenna are not aligned with one another.

* * * * *